(12) United States Patent
Fouquet et al.

(10) Patent No.: US 7,583,863 B2
(45) Date of Patent: Sep. 1, 2009

(54) METHOD AND SYSTEM FOR WAVELENGTH-DEPENDENT IMAGING AND DETECTION USING A HYBRID FILTER

(75) Inventors: Julie E. Fouquet, Portola Valley, CA (US); Richard E. Haven, Sunnyvale, CA (US); Scott W. Corzine, Sunnyvale, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 802 days.

(21) Appl. No.: 10/843,517

(22) Filed: May 10, 2004

(65) Prior Publication Data

US 2005/0249377 A1     Nov. 10, 2005

(51) Int. Cl.
*G06K 7/00* (2006.01)
(52) U.S. Cl. .................. 382/312; 250/370.06; 382/103; 348/229.1; 348/346
(58) Field of Classification Search ............... 382/312, 382/103; 250/250, 370.06; 348/229.1, 342
See application file for complete search history.

(56) References Cited

U.S. PATENT DOCUMENTS

| | | | |
|---|---|---|---|
| 3,771,857 A | 11/1973 | Thomasson et al. | |
| 5,072,109 A | 12/1991 | Aguilera, Jr. et al. | |
| 5,514,888 A * | 5/1996 | Sano et al. .................. | 257/232 |
| 5,901,257 A * | 5/1999 | Chen et al. .................. | 382/312 |
| 6,539,239 B1* | 3/2003 | Loughran et al. ........... | 455/560 |
| 6,788,813 B2* | 9/2004 | Cooper ........................ | 382/167 |
| 6,822,220 B2* | 11/2004 | Lesniak .................. | 250/231.13 |
| 7,064,782 B1* | 6/2006 | Spencer .................... | 348/229.1 |
| 7,180,044 B2* | 2/2007 | Yu ............................. | 250/208.1 |
| 7,257,278 B2* | 8/2007 | Burks et al. ................ | 382/312 |
| 2001/0016053 A1* | 8/2001 | Dickson et al. ............. | 382/110 |
| 2002/0051116 A1 | 5/2002 | Van Saarloos et al. | |
| 2002/0190254 A1 | 12/2002 | Turner et al. | |
| 2004/0070509 A1 | 4/2004 | Grace et al. | |
| 2005/0273011 A1* | 12/2005 | Hattery et al. .............. | 600/476 |

FOREIGN PATENT DOCUMENTS

| | | |
|---|---|---|
| EP | 0024876 | 10/1982 |
| EP | 1 452 127 A1 | 4/2004 |
| EP | 1 526 355 A1 | 4/2005 |

OTHER PUBLICATIONS

The European Search Report Dated: Jul. 22, 2005.

* cited by examiner

*Primary Examiner*—Brian Q Le
*Assistant Examiner*—Aklilu K Woldemariam

(57) ABSTRACT

An object to be imaged or detected is illuminated by a single broadband light source or multiple light sources emitting light at different wavelengths. The light is detected by a detector, which includes a light-detecting sensor covered by a hybrid filter.

21 Claims, 12 Drawing Sheets

METHOD AND SYSTEM FOR WAVELENGTH-DEPENDENT IMAGING AND DETECTION USING A HYBRID FILTER

BACKGROUND

There are a number of applications in which it is of interest to detect or image an object. Detecting an object determines the absence or presence of the object, while imaging results in a representation of the object. The object may be imaged or detected in daylight or in darkness, depending on the application.

Wavelength-dependent imaging is one technique for imaging or detecting an object, and typically involves capturing one or more particular wavelengths that reflect off, or transmit through, an object. In some applications, only solar or ambient illumination is needed to detect or image an object, while in other applications additional illumination is required. But light is transmitted through the atmosphere at many different wavelengths, including visible and non-visible wavelengths. It can therefore be difficult to detect the wavelengths of interest because the wavelengths may not be visible.

FIG. 1 illustrates the spectra of solar emission, a light-emitting diode, and a laser. As can be seen, the spectrum 100 of a laser is very narrow, while the spectrum 102 of a light-emitting diode (LED) is broader in comparison to the spectrum of the laser. And solar emission has a very broad spectrum 104 in comparison to both the LED and laser. The simultaneous presence of broad-spectrum solar radiation can make detecting light emitted from an eyesafe LED or laser and reflected off an object quite challenging during the day. Solar radiation can dominate the detection system and render the relatively weak scatter from the eyesafe light source small by comparison.

Additionally, some filter materials exhibit a distinct absorption spectral peak with a tail extending towards a particular wavelength. FIG. 2 depicts a filter spectrum 200 having an absorption peak 202 and a tail 204 towards the shorter wavelength side. When the wavelengths of interest (e.g., $\lambda_1$ and $\lambda_2$) are spaced closely together, it may be difficult to discriminate or detect one or more particular wavelengths. For example, in FIG. 2, the filter material effectively absorbs light at wavelength $\lambda_2$. But it also partially absorbs light transmitting at wavelength $\lambda_1$. This can make it difficult to detect the amount of light transmitting at wavelength $\lambda_1$.

SUMMARY

In accordance with the invention, a method and system for wavelength-dependent imaging and detection using a hybrid filter are provided. An object to be imaged or detected is illuminated by a single broadband light source or multiple light sources emitting light at different wavelengths. The light is received by a receiving module, which includes a light-detecting sensor and a hybrid filter. The hybrid filter includes a multi-band narrowband filter and a patterned filter layer. The patterned filter layer includes regions of filter material that transmit a portion of the light received from the narrowband filter and filter-free regions that transmit all of the light received from the narrowband filter. Because the regions of filter material absorb a portion of the light passing through the filter material, a gain factor is applied to the light that is transmitted through the regions of filter material. The gain factor is used to balance the scene signals in one or more images and maximize the feature signals in one or more images.

BRIEF DESCRIPTION OF THE DRAWINGS

The invention will best be understood by reference to the following detailed description of embodiments in accordance with the invention when read in conjunction with the accompanying drawings, wherein.

DETAILED DESCRIPTION

The following description is presented to enable one skilled in the art to make and use the invention, and is provided in the context of a patent application and its requirements. Various modifications to the disclosed embodiments will be readily apparent to those skilled in the art, and the generic principles herein may be applied to other embodiments. Thus, the invention is not intended to be limited to the embodiments shown, but is to be accorded the widest scope consistent with the appended claims and with the principles and features described herein. It should be understood that the drawings referred to in this description are not drawn to scale.

Embodiments in accordance with the invention relate to methods and systems for wavelength-dependent imaging and detection using a hybrid filter. A technique for pupil detection is included in the detailed description as an exemplary system that utilizes a hybrid filter in accordance with the invention. Hybrid filters in accordance with the invention, however, can be used in a variety of applications where wavelength-dependent detection and/or imaging of an object or scene is desired. For example, a hybrid filter in accordance with the invention may be used to detect movement along an earthquake fault, to detect the presence, attentiveness, or location of a person or subject, and to detect or highlight moisture in a manufacturing subject. Additionally, a hybrid filter in accordance with the invention may be used in medical and biometric applications, such as, for example, systems that detect fluids or oxygen in tissue and systems that identify individuals using their eyes or facial features. In these biometric identification systems, pupil detection may be used to aim an imager accurately in order to capture required data with minimal user training.

Figure 1:
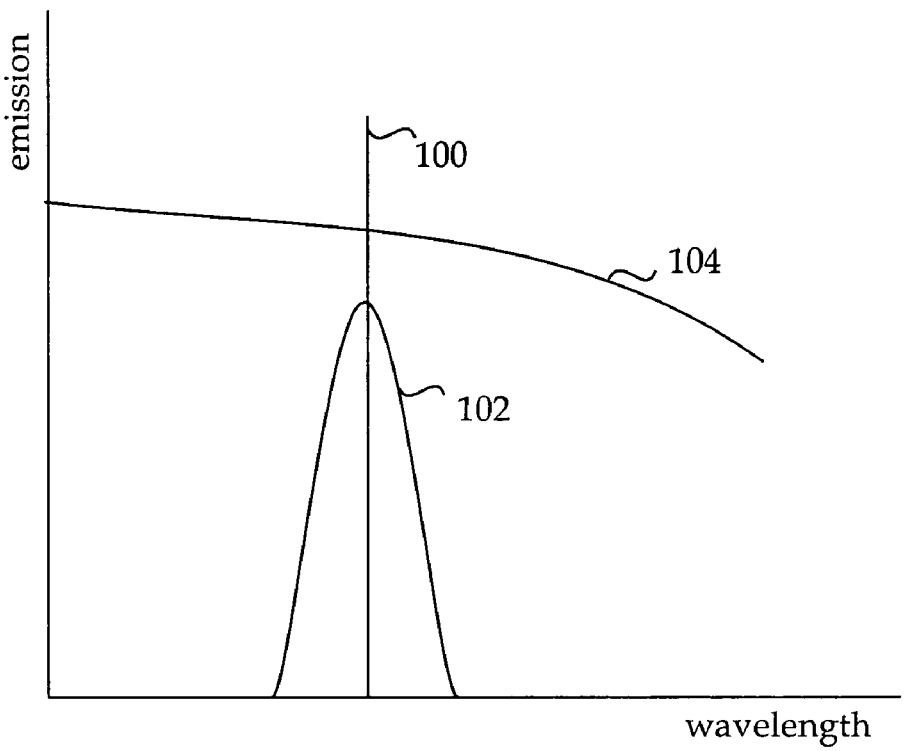
FIG. 1 illustrates the spectra for solar emission, a light-emitting diode, and a laser.
Figure 2:
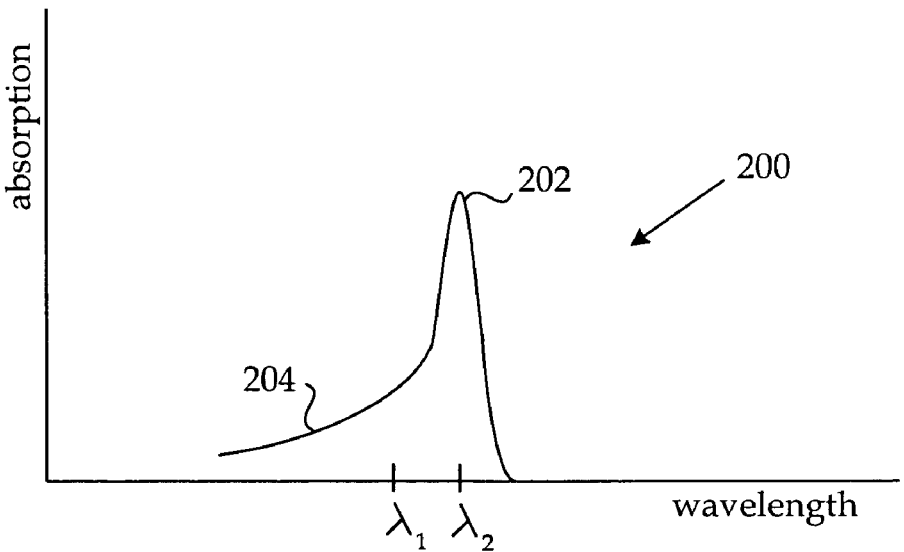
FIG. 2 depicts a filter spectrum having an absorption peak and a tail extending towards the shorter wavelength side.
Figure 3:
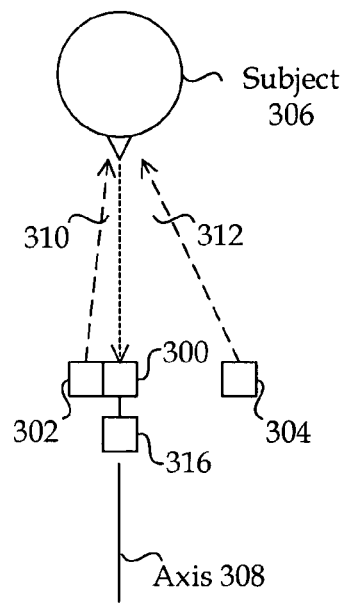
FIG. 3 is a diagram of a first system for pupil detection that uses a hybrid filter in an embodiment in accordance with the invention.

With reference now to the figures and in particular with reference to FIG. 3, there is shown a diagram of a first system for pupil detection that uses a hybrid filter in an embodiment in accordance with the invention. The system includes detector 300 and light sources 302, 304. Light sources 302, 304 are shown on opposite sides of detector 300 in the FIG. 3 embodiment. In another embodiment in accordance with the invention, light sources 302, 304, may be located on the same side of detector 300. And in yet another embodiment in accordance with the invention, a set of light sources 302, 304 may be positioned on both sides of detector 300. Light sources 302, 304 may also be replaced by a single broadband light source emitting light at two or more different wavelengths, such as the sun for example.

In an embodiment for pupil detection, two images are taken of the face and/or eyes of subject 300 using detector 300. One of the images is taken using light source 302, which is close to or on axis 308 of the detector 300 ("on-axis light source"). The second image is taken using light source 304 that is located at a larger angle away from the axis 308 of the detector 300 ("off-axis light source"). When eyes of the subject 306 are open, the difference between the images highlights the pupils of the eyes. This is because specular reflection from the retina is detected only in the on-axis image. The diffuse reflections from other facial and environmental features are largely cancelled out, leaving the pupils as the dominant feature in the differential image. This can be used to infer the subject's 306 eyes are closed when the pupils are not detectable in the differential image.

The amount of time eyes of subject 306 are open or closed can be monitored against a threshold in this embodiment in accordance with the invention. Should the threshold not be satisfied (e.g. the percentage of time the eyes are open falls below the threshold), an alarm or some other action can be taken to alert subject 306. The frequency or duration of blinking may be used as a criteria in other embodiments in accordance with the invention.

Differential reflectivity off a retina of subject 306 is dependent upon angle 310 between light source 302 and axis 308 of detector 300, and angle 312 between light source 304 and axis 308. In general, making angle 310 smaller will increase the retinal return. As used herein, "retinal return" refers to the intensity (brightness) that is reflected off the back of the eye of subject 306 and detected at detector 300. "Retinal return" is also used to include reflection from other tissue at the back of the eye (other than or in addition to the retina). Accordingly, angle 310 is selected such that light source 302 is on or close to axis 308. In this embodiment in accordance with the invention, angle 310 is typically in the range from approximately zero to two degrees.

In general, the size of angle 312 is chosen so that only low retinal return from light source 304 will be detected at detector 300. The iris (surrounding the pupil) blocks this signal, and so pupil size under different lighting conditions should be considered when selecting the size of angle 312. In this embodiment in accordance with the invention, angle 312 is in typically in the range from approximately three to fifteen degrees. In other embodiments in accordance with the invention, the size of angles 310, 312 may be different. For example, the characteristics of a particular subject may determine the size of angles 310, 312.

Light sources 302, 304 emit light at different wavelengths that yield substantially equal image intensity (brightness) in this embodiment in accordance with the invention. Even though light sources 302, 304 can be at any wavelength, the wavelengths selected in this embodiment are chosen so that the light will not distract the subject and the iris of the eye will not contract in response to the light. The selected wavelengths are typically in a range that allows the detector 300 to respond. In this embodiment in accordance with the invention, light sources 302, 304 are implemented as light-emitting diodes (LEDs) or multi-mode lasers having infrared or near-infrared wavelengths. Each light source 302, 304 may be implemented as one, or multiple, sources.

Controller 316 receives the images captured by detector 300 and processes the images. In the embodiment of FIG. 3, controller 316 determines and applies a gain factor to the images captured with the off-axis light source 304. A method for processing the images is described in more detail in conjunction with FIGS. 19 and 20.

Figure 4:
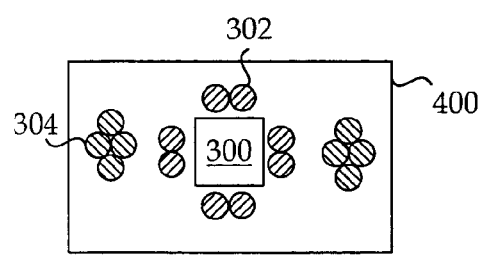
FIG. 4 is a diagram of a device that can be used in the system of FIG. 3.

FIG. 4 is a diagram of a device that can be used in the system of FIG. 3. Device 400 includes detector 300, on-axis light sources 302, and off-axis light sources 304. In FIG. 4, light sources 302 are arranged in a circular pattern around detector 300 and are housed with detector 300. In another embodiment in accordance with the invention, light sources 304 may be located in a housing separate from light sources 302 and detector 300. In yet another embodiment in accordance with the invention, light sources 302 may be located in a housing separate from detector 300 by placing a beam splitter between detector 300 and the object, which has the advantage of permitting a smaller effective on-axis angle of illumination.

Figure 5:
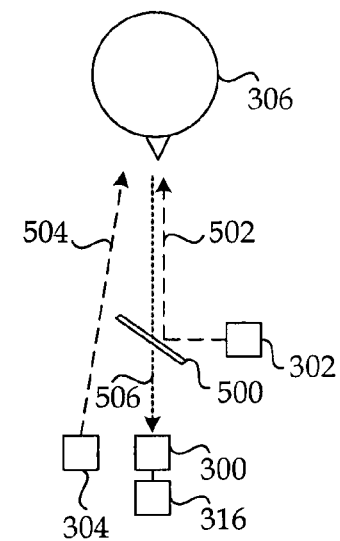
FIG. 5 is a diagram of a second system for pupil detection in an embodiment in accordance with the invention.

Referring now to FIG. 5, there is a second system for pupil detection in an embodiment in accordance with the invention. The system includes detector 300, on-axis light source 302, off-axis light source 304, and controller 316 from FIG. 3. The system also includes beam splitter 500. In this embodiment, detector 300 is positioned adjacent to light source 304. In other embodiments in accordance with the invention, the positioning of detector 300 and light source 302 may be interchanged, with light source 302 adjacent to light source 304.

On-axis light source 302 emits a beam of light towards beam splitter 500. Beam splitter 500 splits the on-axis light into two segments, with one segment 502 directed towards subject 306. A smaller yet effective on-axis angle of illumination is permitted when beam splitter 500 is placed between detector 300 and subject 306.

Off-axis light source 304 also emits beam of light 504 towards subject 306. Light from segments 502, 504 reflects off subject 306 towards beam splitter 500. Light from segments 502, 504 may simultaneously reflect off subject 306 or alternately reflect off subject 306, depending on when light sources 302, 304 emit light. Beam splitter 500 splits the reflected light into two segments and directs one segment 506 towards detector 300. Detector 300 captures two images of subject 306 using the reflected light and transmits the images to controller 316 for processing.

Figure 6:
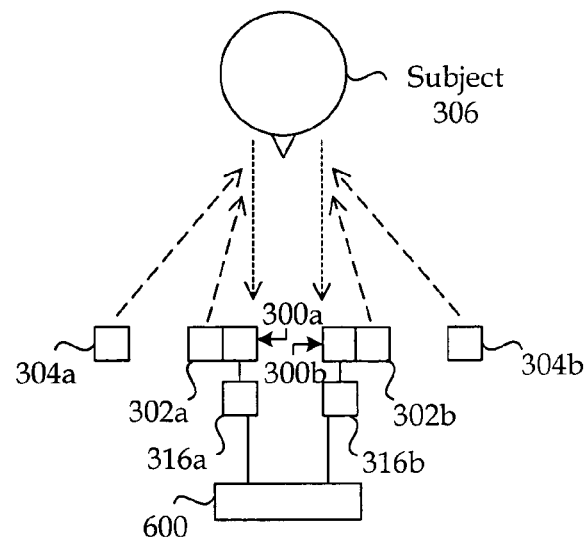
FIG. 6 is a diagram of a third system for pupil detection in an embodiment in accordance with the invention.

FIG. 6 is a diagram of a third system for pupil detection in an embodiment in accordance with the invention. The system includes two detectors 300a, 300b, two on-axis light sources 302a, 302b, two off-axis light sources 304a, 304b, and two controllers 316a, 316b. The system generates a three-dimensional image of the eye or eyes of subject 306 by using two of the FIG. 3 systems in an epipolar stereo configuration. In this embodiment, the comparable rows of pixels in each detector 300a, 300b lie in the same plane. In other embodiments in accordance with the invention comparable rows of pixels do not lie in the same plane and adjustment values are generated to compensate for the row configurations.

Each controller 316a, 316b performs an independent analysis to determine the position of the subject's 306 eye or eyes in two-dimensions. Stereo controller 600 uses the data generated by both controllers 316a, 316b to generate the position of the eye or eyes of subject 306 in three-dimensions. On-axis light sources 302a, 302b and off-axis light sources 304a, 304b may be positioned in any desired configuration. In some embodiments in accordance with the invention, an on-axis light source (e.g. 302b) may be used as the off-axis light source (e.g. 304a) for the opposite system.

Figure 7A:
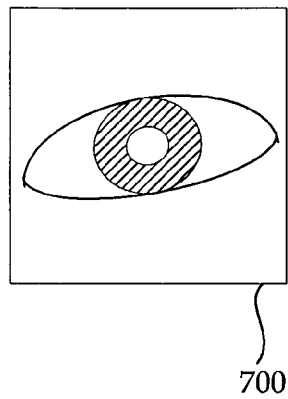
FIG. 7A illustrates an image generated in a first frame with an on-axis light source in accordance with the embodiments of FIG. 3, FIG. 5, and FIG. 6.

FIG. 7A illustrates an image generated in a first frame with an on-axis light source in accordance with the embodiments of FIG. 3, FIG. 5, and FIG. 6. Image 700 shows an eye that is open. The eye has a bright pupil due to a strong retinal return created by on-axis light source 302. If the eye had been closed, or nearly closed, the bright pupil would not be detected and imaged.

Figure 7B:
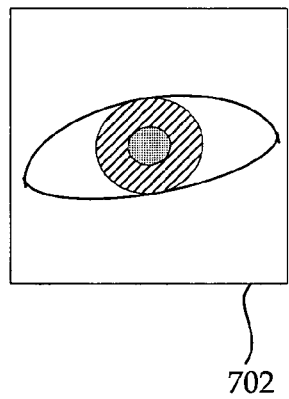
FIG. 7B depicts an image generated in a second frame with an off-axis light source in accordance with the embodiments of FIG. 3, FIG. 5, and FIG. 6.

FIG. 7B depicts an image generated in a first frame with an off-axis light source in accordance with the embodiments of FIG. 3, FIG. 5, and FIG. 6. Image 702 in FIG. 7B may be taken at the same time as the image in FIG. 7A, or it may be taken in an alternate frame (successively or non-successively) to image 700. Image 702 illustrates a normal, dark pupil. If the eye had been closed or nearly closed, the normal pupil would not be detected and imaged.

Figure 7C:
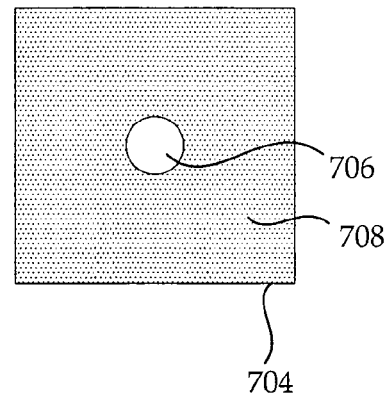
FIG. 7C illustrates a difference image resulting from the subtraction of the image in the second frame in FIG. 7B from the image in the first frame in FIG. 7A.

FIG. 7C illustrates difference image 704 resulting from the subtraction of the image in the second frame in FIG. 7B from the image in the first frame in FIG. 7A. By taking the difference between two images 700, 702, relatively bright spot 706 remains against relatively dark background 708 when the eye is open. There may be vestiges of other features of the eye remaining in background 708. However, in general, bright spot 706 will stand out in comparison to background 708. When the eye is closed or nearly closed, there will not be bright spot 706 in differential image 704.

FIGS. 7A-7C illustrate one eye of subject 306. Those skilled in the art will appreciate that both eyes may be monitored as well. It will also be understood that a similar effect will be achieved if the images include other features of subject 306 (e.g. other facial features), as well as features of the environment of subject 306. These features will largely cancel out in a manner similar to that just described, leaving either bright spot 706 when the eye is open (or two bright spots, one for each eye), or no spot(s) when the eye is closed or nearly closed.

Figure 8:
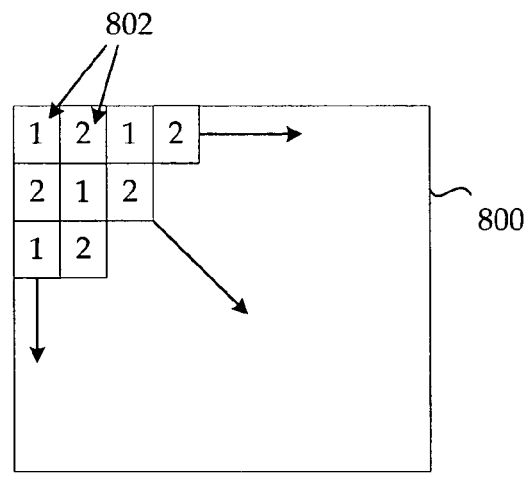
FIG. 8 is a top view of a sensor and a patterned filter layer in an embodiment in accordance with the invention.

Referring now to FIG. 8, there is shown a top view of a sensor and a patterned filter layer in an embodiment in accordance with the invention. In this embodiment, sensor 800 is incorporated into detector 300 (FIG. 3), and is configured as a complementary metal-oxide semiconductor (CMOS) imaging sensor. Sensor 800, however, may be implemented with other types of imaging devices in other embodiments in accordance with the invention, such as, for example, a charge-coupled device (CCD) imager.

A patterned filter layer 802 is formed on sensor 800 using filter materials that cover alternating pixels in the sensor 800. The filter is determined by the wavelengths being used by light sources 302, 304. For example, in this embodiment in accordance with the invention, patterned filter layer 802 includes regions (identified as 1) that include a filter material for blocking the light at the wavelength used by light source 302 and transmitting the light at the wavelength used by light source 304. Other regions (identified as 2) are left uncovered and receive light from light sources 302, 304.

In the FIG. 8 embodiment, patterned filter layer 802 is deposited as a separate layer of sensor 800, such as, for example, on top of an underlying layer, using conventional deposition and photolithography processes while still in wafer form. In another embodiment in accordance with the invention, patterned filter layer 802 can be can be created as a separate element between sensor 800 and incident light. Additionally, the pattern of the filter materials can be configured in a pattern other than a checkerboard pattern. For example, the patterned filter layer can be formed into an interlaced striped or a non-symmetrical configuration (e.g. a 3-pixel by 2-pixel shape). The patterned filter layer may also be incorporated with other functions, such as color imagers.

Various types of filter materials can be used in the patterned filter layer 802. In this embodiment in accordance with the invention, the filter material includes a polymer doped with pigments or dyes. In other embodiments in accordance with the invention, the filter material may include interference filters, reflective filters, and absorbing filters made of semiconductors, other inorganic materials, or organic materials.

Figure 9:
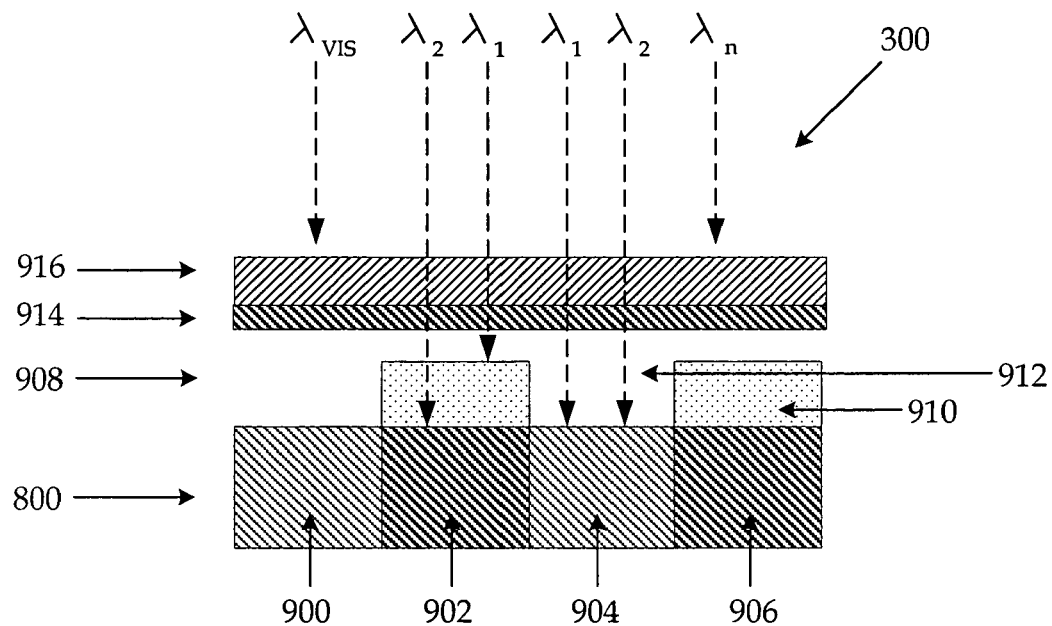
FIG. 9 is a cross-sectional view of a detector in an embodiment in accordance with the invention.

FIG. 9 is a cross-sectional view of a detector in an embodiment in accordance with the invention. Only a portion of the detector is shown in this figure. Detector 300 includes sensor 800 comprised of pixels 900, 902, 904, 906, patterned filter layer 908 including alternating regions of filter material 910 and alternating empty (i.e., no filter material) regions 912, glass cover 914, and dual-band narrowband filter 916. Sensor 800 is configured as a CMOS imager and the patterned filter layer 908 as a polymer doped with pigments or dyes in this embodiment in accordance with the invention. Each filter region 910 in the patterned filter layer 908 (e.g. a square in the checkerboard pattern) overlies a single pixel in the CMOS imager.

Narrowband filter 916 is a dielectric stack filter in this embodiment in accordance with the invention. Dielectric stack filters are designed to have particular spectral properties. In this embodiment in accordance with the invention, the dielectric stack filter is formed as a dual-band filter. Narrowband filter 916 (i.e., dielectric stack filter) is designed to have one peak at $\lambda_1$ and another peak at $\lambda_2$. The shorter wavelength $\lambda_1$ is associated with the on-axis light source 302, and the longer wavelength $\lambda_2$ with off-axis light source 304 in this embodiment in accordance with the invention. The shorter wavelength $\lambda_1$, however, may be associated with off-axis light source 304 and the longer wavelength $\lambda_2$ with on-axis light source 302 in other embodiments in accordance with the invention.

When light strikes narrowband filter 916, the light at wavelengths other than the wavelengths of light source 302 ($\lambda_1$) and light source 304 ($\lambda_2$) are filtered out, or blocked, from passing through narrowband filter 916. Thus, the light at visible wavelengths ($\lambda_{VIS}$) and at wavelengths ($\lambda_n$) are filtered out in this embodiment, while the light at or near the wavelengths $\lambda_1$ and $\lambda_2$ transmit through the narrowband filter 916. Thus, only light at or near the wavelengths $\lambda_1$ and $\lambda_2$ pass through glass cover 914. Thereafter, filter regions 910 transmit the light at wavelength $\lambda_2$ while blocking the light at wavelength $\lambda_1$. Consequently, pixels 902 and 906 receive only the light at wavelength $\lambda_2$.

Filter-free regions 912 transmit the light at wavelengths $\lambda_1$ and $\lambda_2$. In general, more light will reach uncovered pixels 900, 904 than will reach pixels 902, 906 covered by filter regions 910. Image-processing software in controller 316 can be used to separate the image generated in the second frame (corresponding to covered pixels 902, 906) and the image generated in the first frame (corresponding to uncovered pixels 900, 904). For example, controller 316 may include an application-specific integrated circuit (ASIC) with pipeline processing to determine the difference image. And MATLAB®, a product by The MathWorks, Inc. located in Natick, Mass., may be used to design the ASIC.

Figure 10:
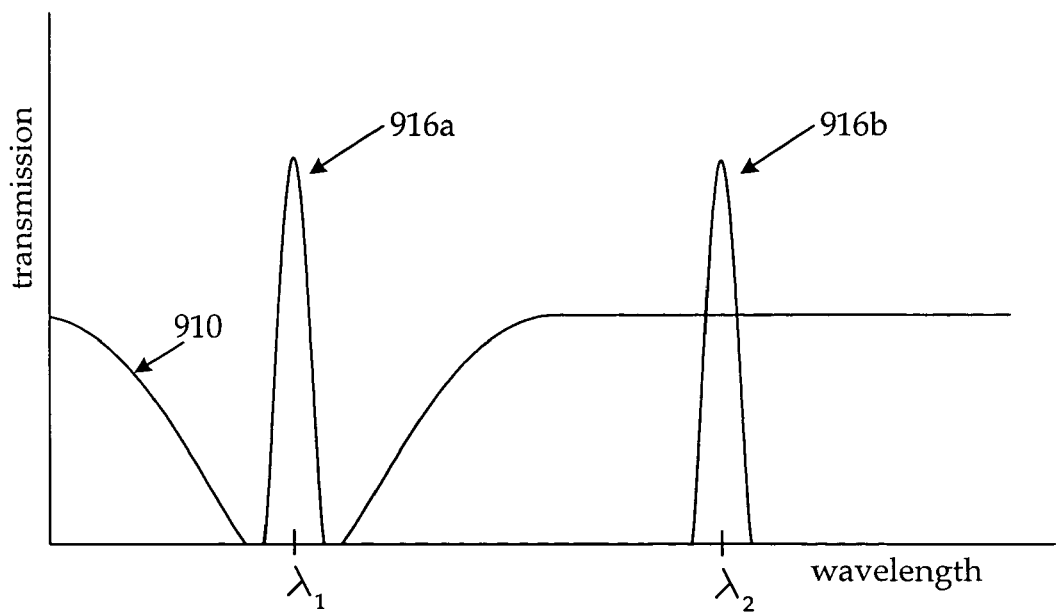
FIG. 10 depicts spectra for the patterned filter layer and the narrowband filter shown in FIG. 9.

Narrowband filter 916 and patterned filter layer 908 form a hybrid filter in this embodiment in accordance with the invention. FIG. 10 depicts spectra for the patterned filter layer and the narrowband filter shown in FIG. 9. As discussed earlier, narrowband filter 916 filters out all light except for the light at or near wavelengths $\lambda_1$ (spectral peak 916a) and $\lambda_2$ (spectral peak 916b). Patterned filter layer 908 blocks light at or near $\lambda_1$ (the minimum in spectrum 910) while transmitting light at or near wavelength $\lambda_2$. Because the light at or near wavelength $\lambda_2$ passes through filter regions 910, a gain factor is applied to the second frame prior to the calculation of a difference image in this embodiment in accordance with the invention. The gain factor compensates for the light absorbed by filter regions 910 and for differences in sensor sensitivity between the two wavelengths. Determination of the gain factor will be described in more detail in conjunction with FIGS. 20 and 21.

Those skilled in the art will appreciate patterned filter layer 908 provides a mechanism for selecting channels at pixel spatial resolution. In this embodiment in accordance with the invention, channel one is associated with the on-axis image and channel two with the off-axis image. In other embodiments in accordance with the invention, channel one may be associated with the off-axis image and channel two with the on-axis image.

Sensor 800 sits in a carrier (not shown) in this embodiment in accordance with the invention. Glass cover 914 typically protects sensor 800 from damage and particle contamination (e.g. dust). In another embodiment in accordance with the invention, the hybrid filter includes patterned filter layer 908, glass cover 914, and narrowband filter 916. Glass cover 914 in this embodiment is formed as a colored glass filter, and is included as the substrate of the dielectric stack filter (i.e., narrowband filter 916). The colored glass filter is designed to have certain spectral properties, and is doped with pigments or dyes. Schott Optical Glass Inc., a company located in Mainz, Germany, is one company that manufactures colored glass that can be used in colored glass filters.

Figure 11:
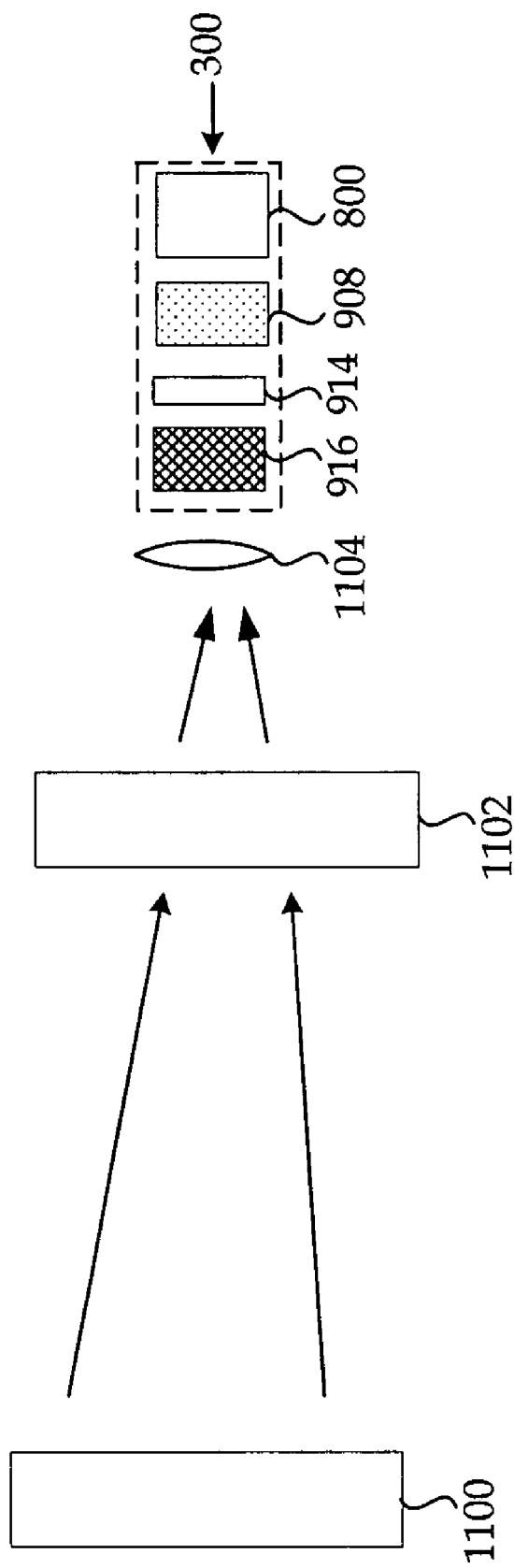
FIG. 11 is a diagram of a system for detecting wavelengths of interest that are transmitted through an object in an embodiment in accordance with the invention.

Referring now to FIG. 11, there is shown a diagram of a system for detecting wavelengths of interest that are transmitted through an object in an embodiment in accordance with the invention. Similar reference numbers have been used for those elements that function as described in conjunction with earlier figures. Detector 300 includes sensor 800, patterned filter layer 908, glass cover 914, and narrowband filter 916.

Broadband light source 1100 transmits light towards transparent object 1102. Broadband light source 1100 emits light at multiple wavelengths, two or more of which are the wavelengths of interest detected by detector 300. In other embodiments in accordance with the invention, broadband light source 1100 may be replaced by two light sources transmitting light at different wavelengths.

Lens 1104 captures the light transmitted through transparent object 1102 and focuses it onto the top surface of narrowband filter 916. For systems using two wavelengths of interest, detector 300 captures one image using light transmitted at one wavelength of interest and a second image using light transmitted at the other wavelength of interest. The images are then processed using the method for image processing described in more detail in conjunction with FIGS. 20 and 21.

As discussed earlier, narrowband filter 916 is a dielectric stack filter that is formed as a dual-band filter. Dielectric stack filters can include any combination of filter types. The desired spectral properties of the completed dielectric stack filter determine which types of filters are included in the layers of the stack.

Figure 12:
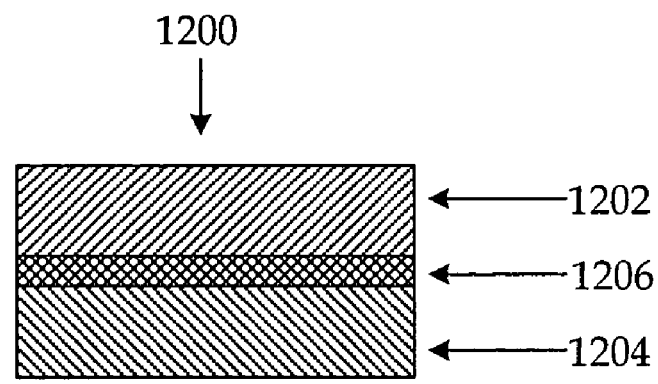
FIG. 12 illustrates a Fabry-Perot resonator used in a first method for fabricating a dual-band narrowband filter in an embodiment in accordance with the invention.

For example, a dual-band filter can be fabricated by stacking three coupled-cavity resonators on top of each other, where each coupled-cavity resonator is formed with two Fabry-Perot resonators. FIG. 12 illustrates a Fabry-Perot (FP) resonator used in a method for fabricating a dual-band narrowband filter in an embodiment in accordance with the invention. Resonator 1200 includes upper Distributed Bragg reflector (DBR) 1202 layer and lower DBR layer 1204. The materials that form the DBR layers include N pairs of quarter-wavelength (m$\lambda$/4) thick low index material and quarter-wavelength (n$\lambda$/4) thick high index material, where the variable N is an integer number and the variables m and n are odd integer numbers. The wavelength is defined as the wavelength of light in a layer, which is equal to the freespace wavelength divided by the layer index of refraction.

Figure 13:
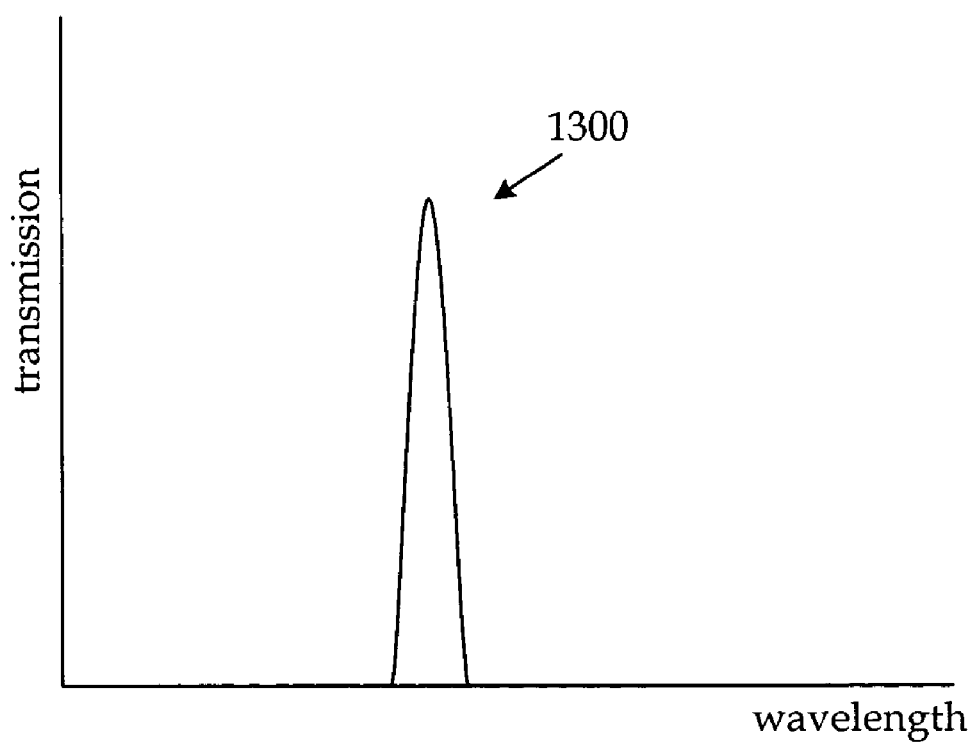
FIG. 13 depicts the spectrum for the Fabry-Perot resonator of FIG. 12.

Cavity 1206 separates two DBR layers 1202, 1204. Cavity 1206 is configured as a half-wavelength (p$\lambda$/2) thick cavity, where p is an integer number. The thickness of cavity 1206 and the materials in DBR layers 1202, 1204 determine the transmission peak for FP resonator 1200. FIG. 13 depicts the spectrum for the Fabry-Perot resonator of FIG. 12. FP resonator 1200 has a single transmission peak 1300.

Figure 14:
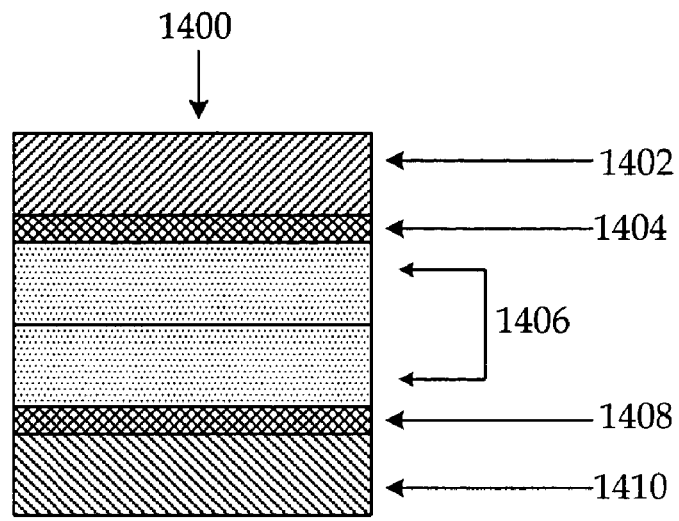
FIG. 14 depicts a coupled-cavity resonator used in the first method for fabricating a dual-band narrowband filter in an embodiment in accordance with the invention.

In this first method for fabricating a dual-band narrowband filter, two FP resonators 1200 are stacked together to create a coupled-cavity resonator. FIG. 14 depicts a coupled-cavity resonator used in the method for fabricating a dual-band narrowband filter in an embodiment in accordance with the invention. Coupled-cavity resonator 1400 includes upper DBR layer 1402, cavity 1404, strong-coupling DBR 1406, cavity 1408, and lower DBR layer 1410. Strong-coupling DBR 1406 is formed when the lower DBR layer of top FP resonator (i.e., layer 1204) merges with an upper DBR layer of bottom FP resonator (i.e., layer 1202).

Figure 15:
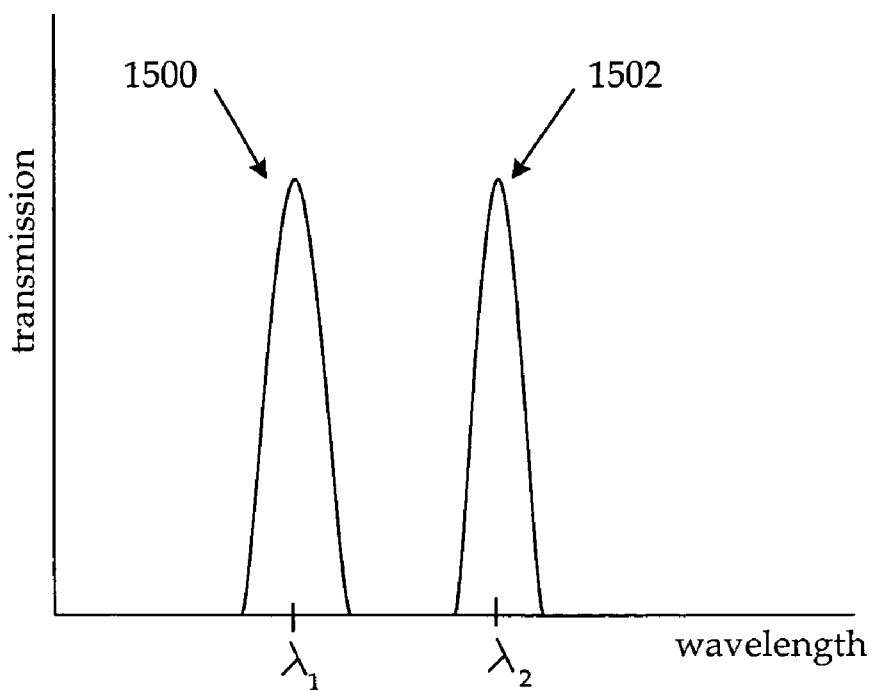
FIG. 15 depicts the spectrum for the coupled-cavity resonator of FIG. 14.

Stacking two FP resonators together splits single transmission peak 1300 in FIG. 13 into two peaks, as shown in FIG. 15. The number of pairs of quarter-wavelength thick index materials in strong-coupling DBR 1406 determines the coupling strength between cavities 1404, 1408. And the coupling strength between cavities 1404, 1408 controls the spacing between peak 1500 and peak 1502.

Figure 16:
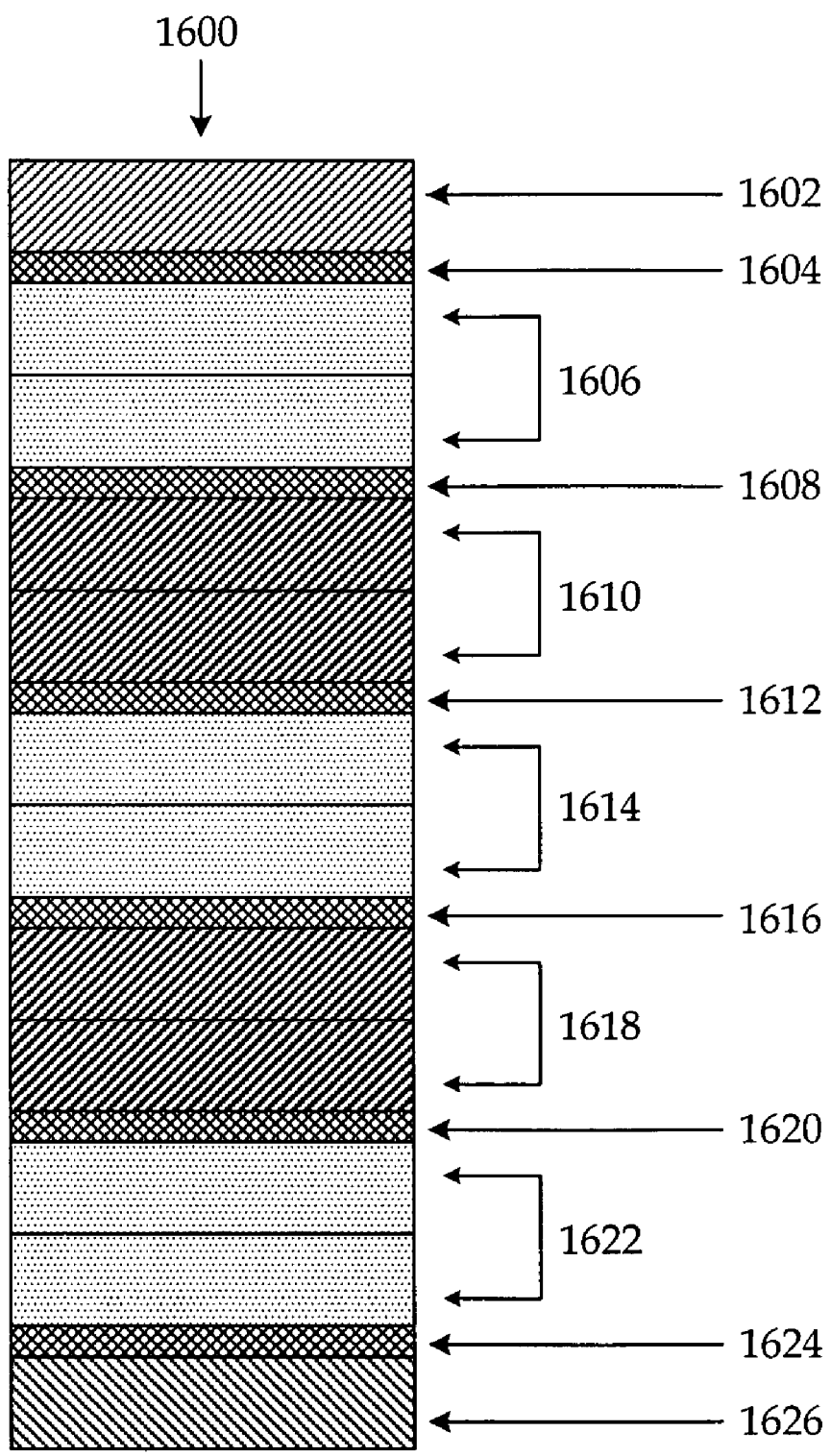
FIG. 16 illustrates a stack of three coupled-cavity resonators that form a dual-band narrowband filter in an embodiment in accordance with the invention.

FIG. 16 illustrates a stack of three coupled-cavity resonators that form a dual-band narrowband filter in an embodiment in accordance with the invention. Dual-band narrowband filter 1600 includes upper DBR layer 1602, cavity 1604, strong-coupling DBR 1606, cavity 1608, weak-coupling DBR 1610, cavity 1612, strong-coupling DBR 1614, cavity 1616, weak-coupling DBR 1618, cavity 1620, strong-coupling DBR 1622, cavity 1624, and lower DBR layer 1626.

Figure 17:
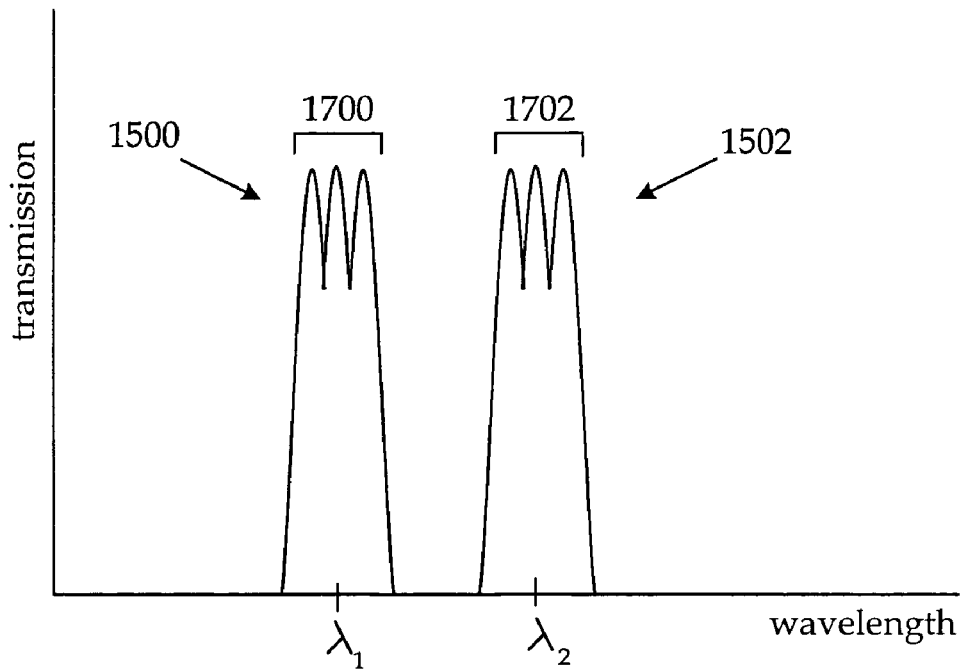
FIG. 17 depicts the spectrum for the dual-band narrowband filter of FIG. 16.

Stacking three coupled-cavity resonators together splits each of the two peaks 1500, 1502 into a triplet of peaks 1700, 1702, respectively. FIG. 17 depicts the spectrum for the dual-band narrowband filter of FIG. 16. Increasing the number of mirror pairs in the coupling DBRs 1610, 1618 reduces the coupling strength in weak-coupling DBRs 1610, 1618. The reduced coupling strength merges each triplet of peaks 1700, 1702 into a single broad, fairly flat transmission band. Changing the number of pairs of quarter-wavelength thick index materials in weak-coupling DBRs 1610, 1618 alters the spacing within the triplet of peaks 1700, 1702.

Figure 18:
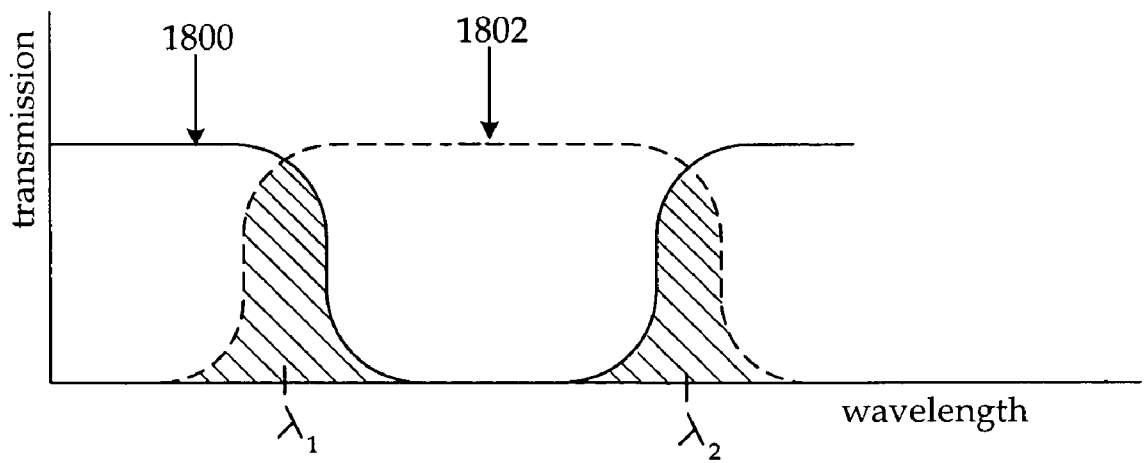
FIG. 18 illustrates a second method for fabricating a dual-band narrowband filter in an embodiment in accordance with the invention.
Figure 19:
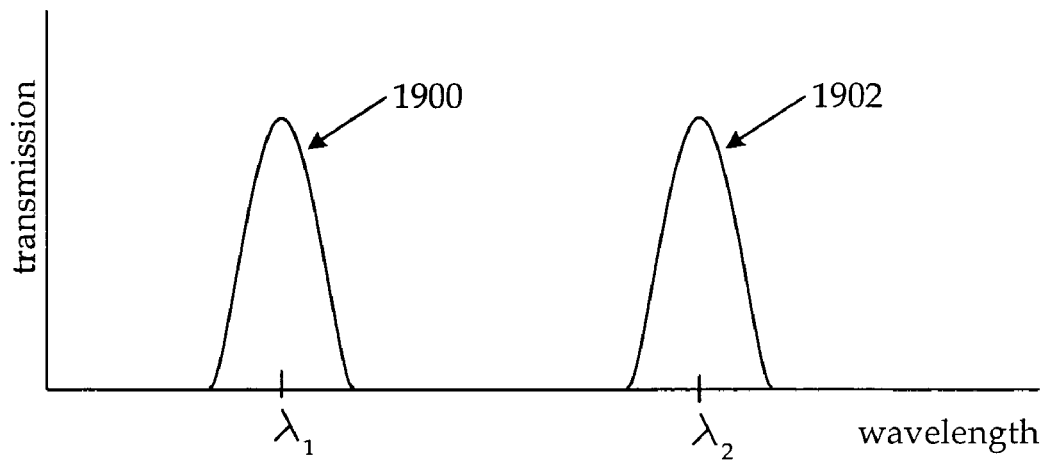
FIG. 19 depicts the spectrum for the dual-band narrowband filter of FIG. 18.

Referring now to FIG. 18, there is shown a second method for fabricating a dual-band narrowband filter in an embodiment in accordance with the invention. A dual-band narrowband filter is fabricated by combining two filters 1800, 1802 in this embodiment. Band-blocking filter 1800 filters out the light at wavelengths between the regions around wavelengths $\lambda_1$ and $\lambda_2$, while bandpass filter 1802 transmits light near and between wavelengths $\lambda_1$ and $\lambda_2$. The combination of filters 1800, 1802 transmits light in the hatched areas, while blocking light at all other wavelengths. FIG. 19 depicts the spectrum for the dual-band narrowband filter in FIG. 18. As can be seen, light transmits through the combined filters only at or near the wavelengths of interest, $\lambda_1$ (peak 1900) and $\lambda_2$ (peak 1902).

Figure 20:
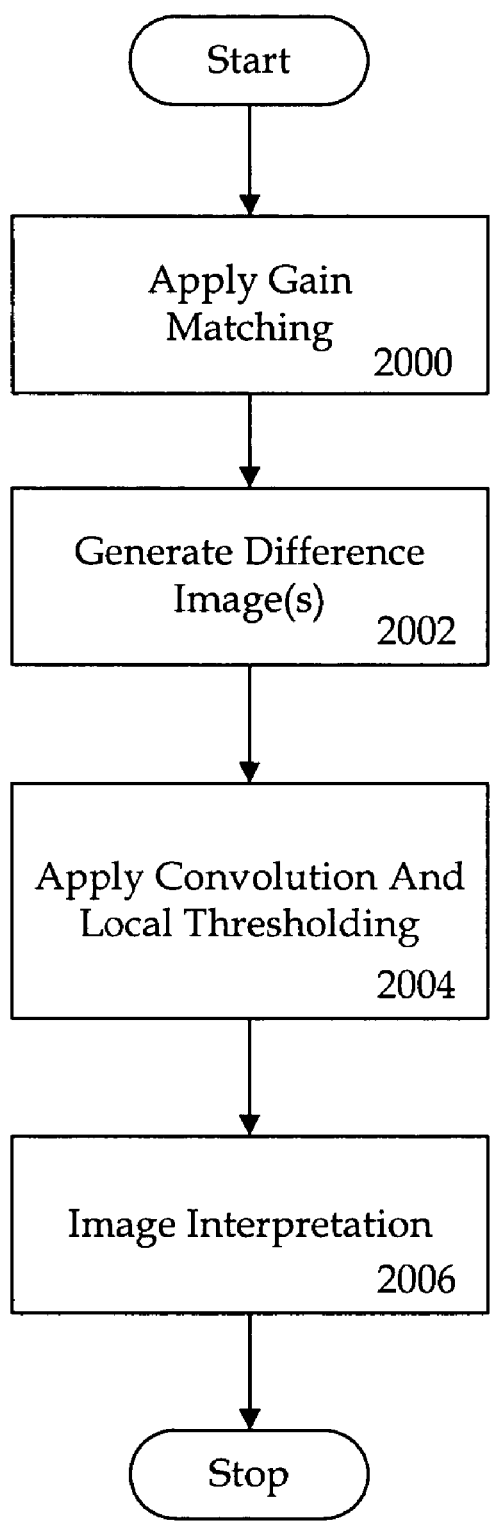
FIG. 20 is a flowchart of a method for image processing of images captured by the detector of FIG. 9.

FIG. 20 is a flowchart of a method for image processing of images captured by detector 300 of FIG. 9. Initially a gain factor is determined and applied to some of the images captured by the detector. This step is shown in block 2000. For example, in the embodiment of FIG. 9, the light transmitting at wavelength $\lambda_2$ passes through filter regions 910 in patterned filter layer 908. Therefore, the gain factor is applied to the images captured at wavelength $\lambda_2$ in order to compensate for the light absorbed by the filter regions 910 and for differences in sensor sensitivity between the two wavelengths.

Next, one or more difference images are generated at block 2002. The number of difference images generated depends upon the application. For example, in the embodiment of FIG. 7, one difference image was generated by subtracting the image in the second frame (FIG. 7B) from the image in the first frame (FIG. 7A). In another embodiment in accordance with the invention, a system detecting K number of wavelengths may generate, for example, K!/2 difference images.

Next, convolution and local thresholding are applied to the images at block 2004. The pixel value for each pixel is compared with a predetermined value. The value given to the predetermined value is contingent upon the application. Each pixel is assigned a color based on the rank of its pixel value in relation to the predetermined value. For example, pixels are assigned the color white when their pixel values exceed the predetermined value. And pixels whose pixel values are less than the predetermined value are assigned the color black.

Image interpretation is then performed on each difference image to determine where a pupil resides within the difference image. For example, in one embodiment in accordance with the invention, algorithms for eccentricity and size analyses are performed. The eccentricity algorithm analyzes resultant groups of white and black pixels to determine the shape of each group. The size algorithm analyzes the resultant groups to determine the number of pixels within each group. A group is determined to not be a pupil when there are too few or too many pixels within a group to form a pupil. A group is also determined to not be a pupil when the shape of the group does not correspond to the shape of a pupil. For example, a group in the shape of a rectangle would not be a pupil. In other embodiments in accordance with the invention, only one algorithm may be performed. For example, only an eccentricity algorithm may be performed on the one or more difference images. Furthermore, additional or different image interpretation functions may be performed on the images in other embodiments in accordance with the invention.

Figure 21:
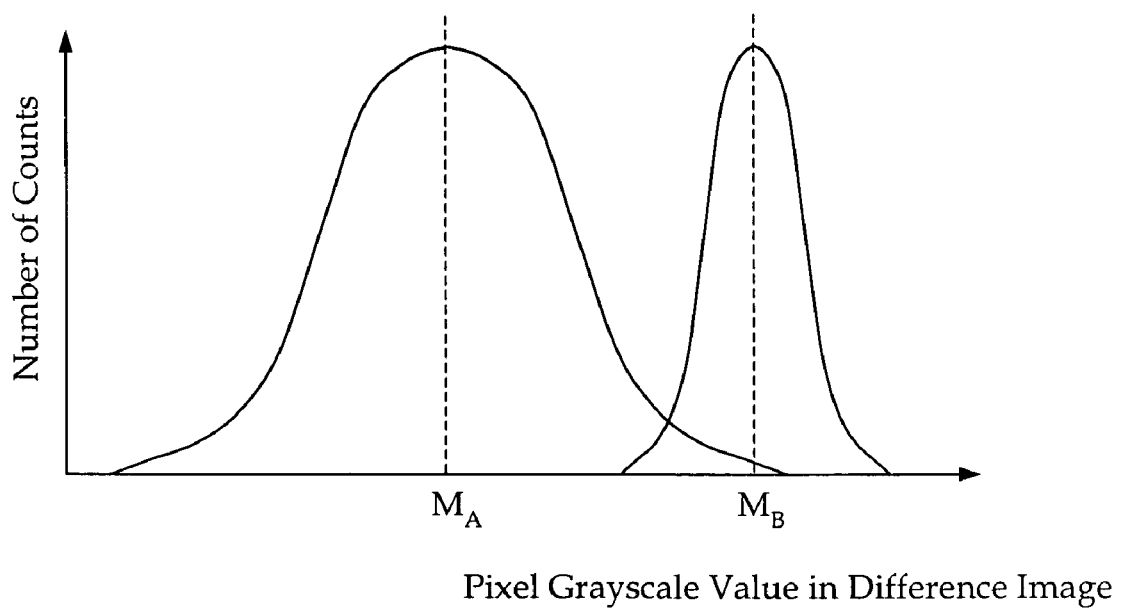
FIG. 21 depicts a histogram of pixel grayscale levels in a first image and a histogram of pixel grayscale levels in a second image in an embodiment in accordance with the invention.

The variables, equations, and assumptions used to calculate a gain factor depend upon the application. FIG. 21 depicts a histogram of pixel grayscale levels in a difference image an embodiment in accordance with the invention. In one embodiment in accordance with the invention, the gain factor is calculated by first generating a histogram of the pixel grayscale levels in the difference image. The contrast between the pupils of the eyes when illuminated with the on-axis light source and when illuminated with the off-axis light source is high in this embodiment. One technique for obtaining high contrast differential images is to select two wavelength bands that reveal a feature of interest with a high degree of contrast between the two wavelength bands and portray the background scene with a low degree of contrast between the two wavelength bands. In order to obtain good contrast in a differential wavelength imager it is desirable to have a large difference between the feature signal levels in the two wavelength bands and a minimal difference between the background scene signal levels in the two wavelength bands. These two conditions can be described as Maximize |feature signal in frame 1−feature signal in frame 2| (1)

Balance scene signal in frame 1 with scene signal in frame 2 (2)

A pixel-based contrast can be defined from the expressions above as:

$$C_p \equiv \left| \frac{\text{feature signal in frame 1} - \text{feature signal in frame 2}}{\text{scene signal in frame 1} - \text{scene signal in frame 2}} \right|$$

In this case, maximizing $C_p$ maximizes contrast. For the pixels representing the background scene, a mean difference in pixel grayscale levels over the background scene is calculated with the equation $$M_A = \frac{\sum_{i=1}^{r} (\text{scene signal in frame 1} - \text{scene signal in frame 2})}{r},$$

where the index i sums over the background pixels and r is the number of pixels in the background scene. For the pixels representing the features of interest (e.g., pupil or pupils), a mean difference grayscale level over the features of interest is calculated with the equation $$M_B = \frac{\sum_{i=1}^{s}(\text{feature signal in frame 1} - \text{feature signal in frame 2})}{r},$$

where the index i sums over pixels showing the feature(s) of interest and s is the number of pixels representing the feature(s) of interest. Each histogram in FIG. 21 has a mean grayscale value M and standard deviation σ.

In this embodiment $|M_B - M_A|$ is large compared to $(\sigma_A + \sigma_B)$ by design. In spectral differential imaging, proper selection of the two wavelength bands yields high contrast to make $|M_B|$ large and proper choice of the gain will make $|M_A|$ small by balancing the background signal in the two frames. In eye detection, angle sensitivity of retinal reflection between the two channels will make $|M_B|$ large and proper choice of the gain will make $|M_A|$ small by balancing the background signal in the two frames. The standard deviations depend on a number of factors, including the source image, the signal gray levels, uniformity of illumination between the two channels, the gain used for channel two (e.g., off-axis image), and the type of interpolation algorithm used to represent pixels of the opposite frame.

It is assumed in this embodiment that a majority of background scenes contain a wide variety of gray levels. Consequently, the standard deviation $\sigma_A$ tends to be large unless the appropriate gain has been applied. In general, a larger value of the difference signal $M_A$ will lead to a larger value of the standard deviation $\sigma_A$, or $$\sigma_A = \alpha M_A$$

where α is approximately constant and assumes the sign necessary to deliver a positive standard deviation $\sigma_A$. In other embodiments in accordance with the invention, other assumptions may be employed. For example, a more complex constant may be used in place of the constant α.

Contrast based on mean values can now be defined as $$C_M \equiv \frac{|M_B - M_A|}{(\sigma_B + \sigma_A)}$$

It is also assumed in this embodiment that $\sigma_A > \sigma_B$, so $C_M$ is approximated as $$C_M \approx \frac{|M_B - M_A|}{\sigma_A} = \left|\frac{M_B}{\alpha M_A} - \frac{1}{\alpha}\right| = \frac{1}{|\alpha|}\left|\frac{M_B}{M_A} - 1\right|$$

To maximize $$C_M, \text{ the } \left|\frac{M_B}{M_A} - 1\right|$$

portion of the equation is maximized by assigning the channels so that $M_B \gg 0$ and $M_A$ is minimized. The equation for $C_M$ then becomes $$C_M \equiv \left|\frac{M_B}{M_A}\right| = \left|\frac{\frac{r}{s}\sum_{i=1}^{s}\left(\begin{array}{c}\text{feature signal in frame 1} -\\ \text{feature signal in frame 2}\end{array}\right)}{\frac{r}{s}\sum_{i=1}^{r}\left(\begin{array}{c}\text{scene signal in frame 1} -\\ \text{scene signal in frame 2}\end{array}\right)}\right|$$

with the above parameters defined as:

feature signal in frame $1 = \int(L_1+A)P_1T_{1,1}S_1 d\lambda + \int(L_2+A)P_2T_{1,2}S_2 d\lambda$.

feature signal in frame $2 = G\lfloor\int(L_2+A)P_2T_{2,2}S_2 d\lambda + \int(L_1+A)P_1T_{2,1}S_1 d\lambda\rfloor$ scene signal in frame $1 = \lfloor\int(L_1+A)X_{x,y,1}T_{1,1}S_1 d\lambda + \int(L_2+A)X_{x,y,2}T_{1,2}S_2 d\lambda\rfloor$ scene signal in frame $2 = G\lfloor\int(L_2+A)X_{x,y,2}T_{2,2}S_2 d\lambda + \int(L_1+A)X_{x,y,1}T_{2,1}S_1 d\lambda\rfloor$, where:

λ=wavelength;

$L_m(\lambda)$ is the power per unit area per unit wavelength of light source m of the differential imaging system at the object, where m represents one wavelength band. Integrating over wavelength band m, $L_m = \int L_m(\lambda)d\lambda$;

$A(\lambda)$ is the ambient light source power per unit area per unit wavelength. Integrating over wavelength band m, $A_m = \int A(\lambda)d\lambda$;

$P_m(\lambda)$ is the reflectance (diffuse or specular) of the point (part of the feature) of interest at wavelength λ per unit wavelength, for wavelength band m. Integrating over wavelength band m, $P_m = \int P_m(\lambda)d\lambda$;

$X_{x,y,m}(\lambda)$ is the background scene reflectance (diffuse or specular) at location x,y on the imager per unit wavelength as viewed at wavelength band m;

$T_{m,n}(\lambda)$ is the filter transmission per unit wavelength for the pixels associated with wavelength band m measured at the wavelengths of band n. Integrating over wavelength for the case m=n, $T_{m,m} = \int T_{m,m}(\lambda)d\lambda$;

$S(\lambda)$ is the sensitivity of the imager at wavelength λ; and

G is a gain factor which is applied to one frame.

In this embodiment, $T_{m,n}(\lambda)$ includes all filters in series, for example both a dual-band narrowband filter and a patterned filter layer. For the feature signal in frame 1, if the wavelength bands have been chosen correctly, $P_1 \gg P_2$ and the second integral on the right becomes negligible. And the relatively small size of $P_2$ makes the first integral in the equation for the feature signal in frame 2 negligible. Consequently, by combining integrands in the numerator, condition (1) from above becomes Maximize $|\int(L_1+A)P_1(T_{1,1} - GT_{2,1})S_1 d\lambda|$.

To meet condition (1), $L_1$, $P_1$, and $S_1$ are maximized within eye safety/comfort limits in this embodiment in accordance with the invention. One approach maximizes $T_{1,1}$, while using a smaller gain G in the wavelength band for channel two and a highly discriminating filter so that $T_{2,1}$ equals or nearly equals zero. For eye detection in the near infrared range, $P_1$ is higher when the shorter wavelength channel is the on-axis channel, due to water absorption in the vitreous humor and other tissues near 950 nm. $S_1$ is also higher when the shorter wavelength channel is the on-axis channel due to higher detection sensitivity at shorter wavelengths.

Note that for the scene signal in frame 1, the second integral should be small if $T_{1,2}$ is small. And in the scene signal in frame 2, the second integral should be small if $T_{2,1}$ is small. More generally, by combining integrands in the denominator, condition (2) from above becomes $$\text{minimize} \quad |\int (L_1+A)X_{x,y,1}(T_{1,1}-GT_{2,1})S_1 d\lambda - \int (L_2+A)X_{x,y,2}(GT_{2,2}-T_{1,2})S_2 d\lambda|.$$

To meet condition (2), the scene signal levels in the two frames in the denominator are balanced in this embodiment in accordance with the invention. Therefore, $$\int (L_1+A)X_{x,y,1}(T_{1,1}-GT_{2,1})S_1 d\lambda = \int (L_2+A)X_{x,y,2}(GT_{2,2}-T_{1,2})S_2 d\lambda.$$

Solving for gain G, $$G = \frac{\int ((L_1+A)X_{x,y,1}T_{1,1}S_1 + (L_2+A)X_{x,y,2}T_{1,2}S_2) d\lambda}{\int ((L_2+A)X_{x,y,2}T_{2,2}S_2 + (L_1+A)X_{x,y,1}T_{2,1}S_1) d\lambda}.$$

It is assumed in this embodiment that $X \equiv X_{x,y,1} \approx X_{x,y,2}$ for most cases, so the equation for the gain is reduced to $$G \approx \frac{\int ((L_1+A)T_{1,1}S_1 + (L_2+A)T_{1,2}S_2) d\lambda}{\int ((L_2+A)T_{2,2}S_2 + (L_1+A)T_{2,1}S_1) d\lambda}.$$

Filter crosstalk in either direction does not exist in some embodiments in accordance with the invention. Consequently, $T_{1,2}, T_{2,1} = 0$, and the equation for the gain is $$G_{noXtalk} \approx \frac{\int (L_1+A)T_{1,1}S_1 d\lambda}{\int (L_2+A)T_{2,2}S_2 d\lambda}.$$

When a dielectric stack filter is used in series with other filters, the filter transmission functions may be treated the same, as the peak levels are the same for both bands. Thus, the equation for the gain becomes $$G_{noXtalk} \approx \frac{(L_1(\lambda_1)+A_1)T_{1,1}(\lambda_1)S_1(\lambda_1)}{(L_2(\lambda_2)+A_2)T_{2,2}(\lambda_2)S_2(\lambda_2)}.$$

Defining $$S \equiv \frac{S_1(\lambda_1)}{S_2(\lambda_2)}$$

the gain equation is $$G_{noXtalk} \approx \left(\frac{L_1(\lambda_1)+A_1}{L_2(\lambda_2)+A_2}\right) S \frac{T_{1,1}(\lambda_1)}{T_{2,2}(\lambda_2)}.$$

If the sources are turned off, $L_1, L_2 = 0$ and $$G_{AnoXtalk} \approx \frac{A_1 T_{1,1}(\lambda_1)}{A_2 T_{2,2}(\lambda_2)} S,$$

where $G_{AnoXtalk}$ is the optimal gain for ambient lighting only. In this embodiment, the entire image is analyzed for this calculation in order to obtain relevant contrasts. The entire image does not have to be analyzed in other embodiments in accordance with the invention. For example, in another embodiment in accordance with the invention, only a portion of the image near the features of interest may be selected.

Since the ambient spectrum due to solar radiation and the ratio of ambient light in the two channels change both over the course of the day and with direction, the measurements to determine gain are repeated periodically in this embodiment. The ratio of measured light levels is calculated by taking the ratio of the scene signals in the two channels with the light sources off and by applying the same assumptions as above:

$$R_{AnoXtalk} \equiv \frac{\text{scene signal in subframe 1}}{\text{scene signal in subframe 2}} = \frac{A_1 T_{1,1} S_1}{A_2 T_{2,2} S_2}.$$

Solving for the ratio of the true ambient light levels $$\frac{A_1}{A_2},$$

the equation becomes $$\frac{A_1}{A_2} = R_{AnoXtalk} \frac{T_{2,2} S_2}{T_{1,1} S_1}.$$

Substituting this expression into the equation for $G_{AnoXtalk}$ yields $$G_{AnoXtalk} = R_{AnoXtalk}.$$

Thus the gain for ambient lighting can be selected as the ratio of the true ambient light levels in the two channels $(A_1/A_2)$ as selected by the dielectric stack filter.

When the light sources are driven relative to the ambient lighting, as defined in the equation $$\frac{L_1(\lambda_1)}{L_2(\lambda_2)} = \frac{A_1}{A_2},$$

the gain expressions for both the ambient- and intentionally-illuminated no-crosstalk cases will be equal, i.e. $G_{noXtalk} = G_{Anoxtalk}$, even in dark ambient conditions where the system sources are more significant. Thus the gain is constant through a wide range of ambient light intensities when the sources are driven at levels whose ratio between the two channels matches the ratio of the true ambient light levels.

In those embodiments with crosstalk in only one of the filters, the expression for the gain can be written as $$G = \frac{\int ((L_1 + A)X_{x,y,1}T_{1,1}S_1 + (L_2 + A)X_{x,y,2}T_{1,2}S_2)d\lambda}{\int (L_2 + A)X_{x,y,2}T_{2,2}S_2 d\lambda},$$

where $T_{2,1}=0$, thereby blocking crosstalk at wavelength band 1 into the pixels associated with wavelength band 2. Assuming $X_{x,y,1} \approx X_{x,y,2}$, this expression can also be written as $$G \approx \frac{\int (L_1 + A)T_{1,1}S_1 d\lambda}{\int (L_2 + A)T_{2,2}S_2 d\lambda} + \frac{\int (L_2 + A)T_{1,2}S_2 d\lambda}{\int (L_2 + A)T_{2,2}S_2 d\lambda}.$$

The filter transmission functions are treated similar to delta functions (at the appropriate wavelengths multiplied by peak transmission levels) in this embodiment, so the equation for the gain becomes $$G \approx \frac{(L_1(\lambda_1) + A_1)T_{1,1}(\lambda_1)S_1(\lambda_1)}{(L_2(\lambda_2) + A_2)T_{2,2}(\lambda_2)S_2(\lambda_2)} + \frac{(L_2(\lambda_2) + A_2)T_{1,2}(\lambda_2)S_2(\lambda_2)}{(L_2(\lambda_2) + A_2)T_{2,2}(\lambda_2)S_2(\lambda_2)}.$$

Defining $$S \equiv \frac{S_1(\lambda_1)}{S_2(\lambda_2)},$$

the equation simplifies to $$G \approx \left(\frac{L_1(\lambda_1) + A_1}{L_2(\lambda_2) + A_2}\right) S \frac{T_{1,1}(\lambda_1)}{T_{2,2}(\lambda_2)} + \frac{T_{1,2}(\lambda_2)}{T_{2,2}(\lambda_2)}.$$

The ratio of the true ambient light levels is calculated by taking the ratio of the scene signals in the two channels with light sources off and applying the same assumptions as above. Therefore, the ratio of the measured signal levels is $$R_A \equiv \frac{\text{scene signal in frame 1}}{\text{scene signal in frame 2}} = \frac{A_1 T_{1,1} S_1}{A_2 T_{2,2} S_2} + \frac{T_{1,2}}{T_{2,2}}.$$

Solving for $$\frac{A_1}{A_2},$$

the equation becomes $$\frac{A_1}{A_2} = \left(R_A - \frac{T_{1,2}}{T_{2,2}}\right)\frac{T_{2,2} S_2}{T_{1,1} S_1}$$

and again $G_A = R_A$. Thus, in the embodiments with crosstalk, the ambient gain is set as the ratio of the measured ambient light levels. Similar to the no-crosstalk embodiment above, the illumination levels are set in proportion to the ratio of the true ambient light levels. The system then operates with constant gain over a wide range of illumination conditions.

In practice, for some applications, the feature signal fills so few pixels that the statistics for the entire subframes can be used to determine the gain factor. For example, for pupil detection at a distance of sixty centimeters using a VGA imager with a twenty-five degree full angle field of view, the gain can be set as the ratio of the mean grayscale value of channel one divided by the mean grayscale value of channel 2. Furthermore, those skilled in the art will appreciate that other assumptions than the ones made in the above calculations can be made when determining a gain factor. The assumptions depend on the system and application in use.

Figure 22:
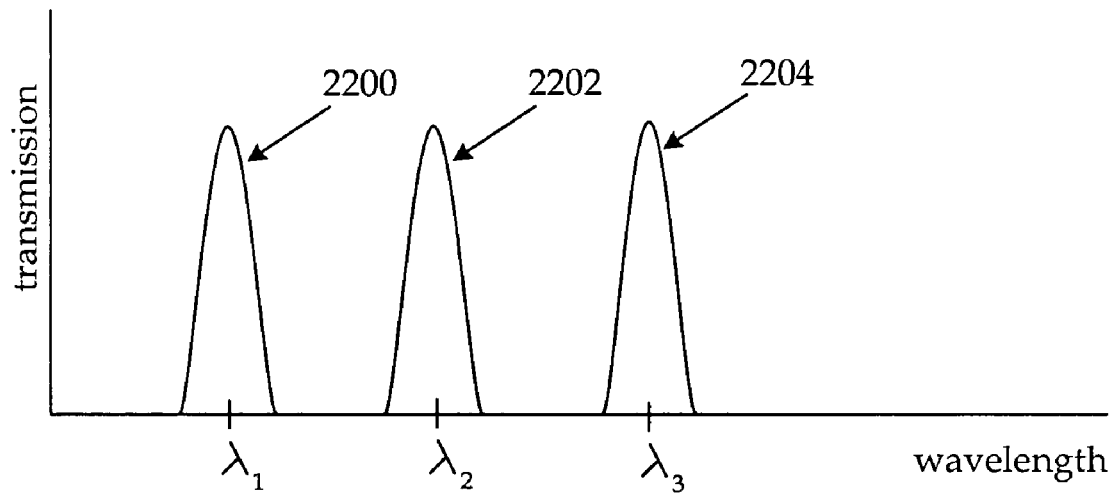
FIG. 22 illustrates spectra for a patterned filter layer and a tri-band narrowband filter in an embodiment in accordance with the invention.

Although a hybrid filter and the calculation of a gain factor has been described with reference to detecting light at two wavelengths, $\lambda_1$ and $\lambda_2$, hybrid filters in other embodiments in accordance with the invention may be used to detect more than two wavelengths of interest. FIG. 22 illustrates spectra for a patterned filter layer and a tri-band narrowband filter in an embodiment in accordance with the invention. A hybrid filter in this embodiment detects light at three wavelengths of interest, $\lambda_1$, $\lambda_2$, and $\lambda_3$. Spectra 2200, 2202, and 2204 at wavelengths $\lambda_1$, $\lambda_2$, and $\lambda_3$, respectively, represent three signals to be detected by an imaging system. Typically, one wavelength is chosen as a reference, and in this embodiment wavelength $\lambda_2$ is used as the reference.

Figure 23:
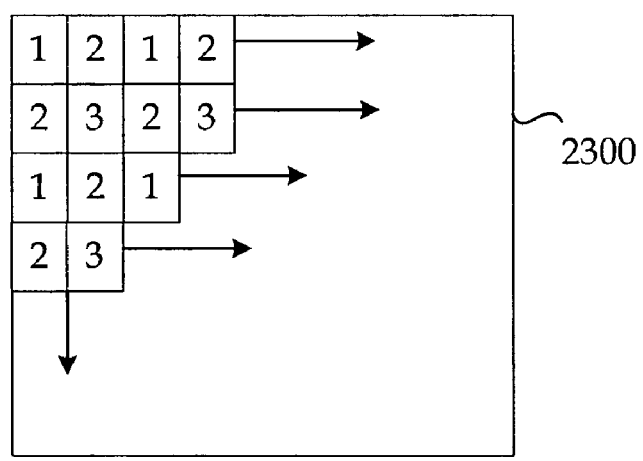
FIG. 23 depicts a sensor in accordance with the embodiment shown in FIG. 22.

A tri-band narrowband filter transmits light at or near the wavelengths of interest ($\lambda_1$, $\lambda_2$, and $\lambda_3$) while blocking the transmission of light at all other wavelengths in this embodiment in accordance with the invention. Photoresist filters in a patterned filter layer then discriminate between the light received at wavelengths $\lambda_1$, $\lambda_2$, and $\lambda_3$. FIG. 23 depicts a sensor in accordance with the embodiment shown in FIG. 22. A patterned filter layer is formed on sensor 2300 using three different filters. Each filter region transmits only one wavelength. For example, in one embodiment in accordance with the invention, sensor 2300 may include a color three-band filter pattern. Region 1 transmits light at $\lambda_1$, region 2 at $\lambda_2$, and region 3 at $\lambda_3$.

Determining a gain factor for the sensor of FIG. 23 begins with

Maximizing |feature signal in frame 1–feature signal in frame 2|  (1)

Maximizing |feature signal in frame 3–feature signal in frame 2|  (2)

and

Balance scene signal in frame 1 with scene signal in frame 2  (3)

Balance scene signal in frame 3 with scene signal in frame 2  (4)

which becomes

Maximize=$|\int (L_1+A)P_1 T_{1,1} S_1 d\lambda - G_{1,2} \int (L_2+A)P_2 T_{2,2} S_2 d\lambda|$ Maximize=$|\int (L_3+A)P_3 T_{3,3} S_3 d\lambda - G_{3,2} \int (L_2+A)P_2 T_{2,2} S_2 d\lambda|$ and $\int (L_3+A)X_{x,y,1} T_{1,1} S_1 d\lambda = G_{1,2} \int (L_2+A)X_{x,y,2} T_{2,2} S_2 d\lambda$ $\int (L_3+A)X_{x,y,3} T_{3,3} S_3 d\lambda = G_{3,2} \int (L_2+A)X_{x,y,2} T_{2,2} S_2 d\lambda$ where $G_{1,2}$ is the gain applied to the reference the channel at ($\lambda_2$) in order to match channel 1 (e.g., $\lambda_1$) and $G_{3,2}$ is the gain applied to the reference channel 2 ($\lambda_2$) in order to match channel 3 (e.g., $\lambda_3$). Following the calculations from the two-wavelength embodiment (see FIG. 21 and its description), the gain factors are determined as $$G_{1,2} \approx \frac{A_1 T_{1,1}(\lambda_1) S_1(\lambda_1)}{A_2 T_{2,2}(\lambda_2) S_2(\lambda_2)}$$

where $G_{1,2}=R_{1,2}$, the ratio of the scene signals. And $$G_{3,2} \approx \frac{A_3 T_{3,3}(\lambda_3) S_3(\lambda_3)}{A_2 T_{2,2}(\lambda_2) S_2(\lambda_2)}$$

where $G_{3,2}=R_{3,2}$, the ratio of the scene signals.

Like the two-channel embodiment of FIG. 8, one of the three channels in FIG. 23 (e.g. channel 2) may not be covered by a pixel filter. The gain factor may be calculated similarly to the embodiment described with reference to FIG. 21.

The invention claimed is:

1. A receiving module, comprising:
a patterned filter layer comprising regions of filter material that transmit a portion of light received at the patterned filter layer and filter-free regions that transmit all of the light received at the patterned filter layer, the regions of the filter material and the filter-free regions being regions arranged in rows and columns such that at least one of the filter-free regions is positioned between the regions of the filter material in each row and in each column;
a light-detecting sensor positioned to receive the light transmitted through the patterned filter layer, the light-detecting sensor including an arrangement of pixels, some of the pixels of the light-detecting sensor being positioned to receive the light transmitted through the regions of filter material of the patterned filter layer, some of the pixels of the light-detecting sensor being positioned to receive the light transmitted through the filter-free regions of the patterned filter layer and
a controller configured to determine at least one gain factor for images detected by the light-detecting sensor using a pixel-based contrast defined as $C_p$=|(feature signal in frame $N$-feature signal in frame $M$)|/|(scene signal in frame $N$-scene signal in frame $M$)|

Where $C_p$ is the pixel-based contrast and N and M are integer numbers, wherein the scene signal represent a background scene of the images and the feature signal represents at least one feature of interest in the images.

2. The receiving module of claim 1, wherein the light-detecting sensor comprises a light-detecting imaging sensor.

3. The receiving module of claim 1, further comprising a narrowband filter layer comprised of a dielectric stack filter, wherein the patterned filter layer is positioned between the narrowband filter layer and the light-detecting sensor.

4. The receiving module of claim 3, wherein the dielectric stack filter comprises a colored glass filter.

5. The receiving module of claim 3, wherein the dielectric stack filter comprises N coupled-cavity resonators stacked together, where N is an integer number.

6. The receiving module of claim 1, wherein the patterned filter layer is comprised of one of patterned dye-doped polymers, patterned pigment-doped polymers, patterned interference filters, patterned reflective filters, and patterned absorbing filters.

7. An imaging system comprising:
a first receiving module comprising a first light-detecting sensor and a first hybrid filter, the first hybrid filter including a narrowband filter layer and a patterned filter layer, the patterned filter layer comprising regions of filter material that transmit a portion of light received at the patterned filter layer and filter-free regions that transmit all of the light received at the patterned filter layer, the regions of the filter material and the filter-free regions being regions arranged in rows and columns such that at least one of the filter-free regions is positioned between the regions of the filter material in each row and in each column, the first light-detecting sensor being positioned to receive the light transmitted through the patterned filter layer, the light-detecting sensor including an arrangement of pixels, some of the pixels of the light-detecting sensor being positioned to receive the light transmitted through the regions of filter material of the patterned filter layer, some of the pixels of the light-detecting sensor being positioned to receive the light transmitted through the filter-free regions of the patterned filter layer; and
a first controller connected to the receiving module, the first controller being configured to determine at least one gain factor for images detected by the first light-detecting sensor using a pixel-based contrast defined as $$C_p = \left|\frac{\text{feature signal in frame } N - \text{feature signal in frame } M}{\text{scene signal in frame } N - \text{scene signal in frame } M}\right|,$$

where $C_p$ is the pixel-based contrast and N and M are integer numbers, wherein the scene signal represent a background scene of the images and the feature signal represents at least one feature of interest in the images.

8. The imaging system of claim 7, further comprising
a second receiving module comprising a second hybrid filter and a second light-detecting sensor;
a second controller connected to the second receiving module; and
a stereo controller connected to the first and second controllers.

9. The imaging system of claim 7, further comprising a source emitting light towards an object.

10. The imaging system of claim 9, wherein the source comprises a single broadband light source emitting light at two or more wavelengths of interest.

11. The imaging system of claim 9, wherein the source comprises multiple light sources emitting light at two or more wavelengths.

12. The imaging system of claim 7, wherein the first hybrid filter receives light reflected off the object.

13. The imaging system of claim 7, wherein the first hybrid filter receives light transmitted through the object.

14. The imaging system of claim 11, wherein the first and second controllers each determine at least one difference image using images detected at or near each of the two or more wavelengths of interest.

15. The imaging system of claim 14, wherein the first and second controllers each determine at least one gain factor by using two or more histograms comprised of pixel values included in the images detected by the first and second light-detecting sensors, respectively.

16. A method for wavelength-dependent detection, comprising:

receiving light from an object at a detector of an imaging system, wherein the light includes light propagating at two or more wavelengths of interest;

discriminating between light received at or near the two or more wavelengths of interest while simultaneously blocking light received at all other wavelength by the detector;

detecting the amount of light received at or near the two or more wavelengths of interest;

generating a plurality of images using the detected amount of light received at or near the two or more wavelengths of interest by the detector so that an image is generated for each of the two or more wavelengths of interest; and applying at least one gain factor to the images associated with a portion of the wavelengths of interest by a processor of the image system, wherein the at least one gain factor is determined by the processor using a pixel-based contrast defined as $C_p = |(\text{feature signal in frame } N - \text{feature signal in frame } M)|/|(\text{scene signal in frame } N - \text{scene signal in frame } M)|$ Where $C_p$ is the pixel-based contrast and N and M are integer numbers, wherein the scene signal represent a background scene of the images and the feature signal represents at least one feature of interest in the images.

17. The method of claim 16, wherein the discriminating between the light received at or near the two or more wavelengths of interest includes transmitting the light through a hybrid filter including a narrowband filter layer and a patterned filter layer, the patterned filter layer comprising regions of filter material that transmit a portion of the light received at the patterned filter layer and filter-free regions that transmit all of the light received at the patterned filter layer, the regions of the filter material and the filter-free regions being regions arranged in rows and columns such that at least one of the filter-free regions is positioned between the regions of the filter material in each row and in each column, and wherein the detecting the amount of light received at or near the two or more wavelengths of interest includes receiving the light transmitted through the regions of filter material of the patterned filter layer, some of the pixels of the light-detecting sensor being positioned to receive light transmitted through the filter-free regions of the patterned filter layer.

18. The method of claim 16, wherein receiving light from the object comprises receiving light reflected off or transmitted through the object.

19. The method of claim 16, further comprising selecting the two or more wavelengths of interest in order to obtain a high-contrast difference image.

20. The method of claim 16, wherein applying at least one gain factor to the images associated with a portion of the wavelengths of interest comprises:

determining a histogram comprised of pixel values included in each image associated with a respective wavelength of interest, calculating a mean of the pixel values in each histogram, and calculating at least one gain factor, wherein the at least one gain factor is multiplied with at least one mean such that all of the means are equal in value.

21. The method of claim 16, wherein the at least one gain factor is determined using a first condition of (1) Balancing the scene signal in frame N with the scene signal in frame M and a second condition of (2) Maximizing |feature signal in frame N−feature signal in M|, where N and M are integer numbers.

* * * * *

UNITED STATES PATENT AND TRADEMARK OFFICE
CERTIFICATE OF CORRECTION

PATENT NO. : 7,583,863 B2  
APPLICATION NO. : 10/843517  
DATED : September 1, 2009  
INVENTOR(S) : Julie Fouquet et al.

Page 1 of 1

It is certified that error appears in the above-identified patent and that said Letters Patent is hereby corrected as shown below:

Column 17, Line 53, Claim 1, delete "Where" and insert --where--.

Column 18, Line 42 (approx.), Claim 8, after "comprising" insert --:--.

Column 18, Line 56, Claim 11, delete "wavelengths." and insert --wavelengths of interest.--.

Column 19, Line 26 (approx.), Claim 16, delete "Where" and insert --where--.

Signed and Sealed this  
Twenty-fifth Day of September, 2012

David J. Kappos  
*Director of the United States Patent and Trademark Office*